Feb. 10, 1925. Re. 15,998

P. W. CARROLL

WRINGER DEVICE

Original Filed Nov. 20, 1919

WITNESSES

J. Hebel Bradley.

INVENTOR

Paul W. Carroll

By Greenwald & McCallister

His Attorneys

Reissued Feb. 10, 1925. Re. 15,998

UNITED STATES PATENT OFFICE.

PAUL W. CARROLL, OF DES MOINES, IOWA, ASSIGNOR, BY MESNE ASSIGNMENTS, TO HARRY E. SHELDON AND ROBERT D. CAMPBELL, OF PITTSBURGH, PENNSYLVANIA.

WRINGER DEVICE.

Original No. 1,392,478, dated October 4, 1921, Serial No. 339,455, filed November 20, 1919. Application for reissue filed January 25, 1922. Serial No. 531,806.

*To all whom it may concern:*

Be it known that I, PAUL W. CARROLL, a citizen of the United States, and a resident of Des Moines, in the county of Polk and the State of Iowa, have made a new and useful Invention in Wringer Devices, of which the following is a specification.

The object of my invention is to provide a wringer device, which may be made as part of a wringer used in connection with washing machines or as an attachment thereto, and which is adapted to prevent the tearing of buttons from clothing during the wringing process.

More particularly it is my object to provide in connection a wringer having rolls with means including endless belts and rollers, so constructed and mounted as to guide and direct the feeding of clothes to the wringer in such manner that buttons will always be presented edgewise to the wringer rolls, and will therefore never be torn from the garments to which they are fastened.

With these and other objects in view, my invention consists in the construction, arrangement and combination of the various parts of the device, whereby the objects contemplated are attained, as hereinafter more fully set forth, pointed out in my claims and illustrated in the accompanying drawings, in which:

Figure 4:
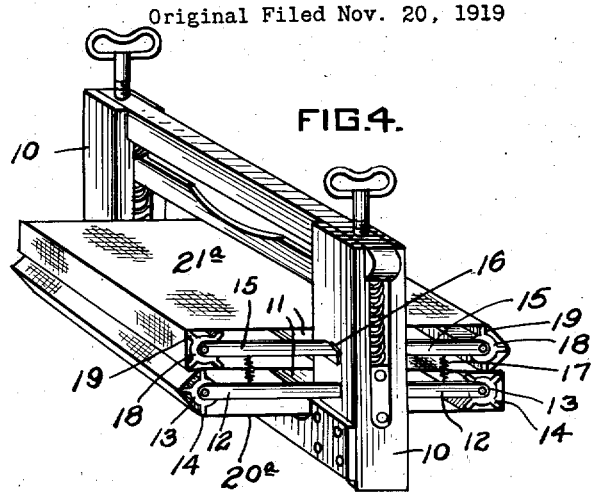
Fig. 4 shows a perspective view of a modified form of my invention.

In the accompanying drawings, I have used the reference numeral 10 to indicate generally an ordinary wringer of the type used with domestic washing machines, having the parallel rubber covered rolls 11. Wringers of this type have upright supports at their ends.

Figure 1:
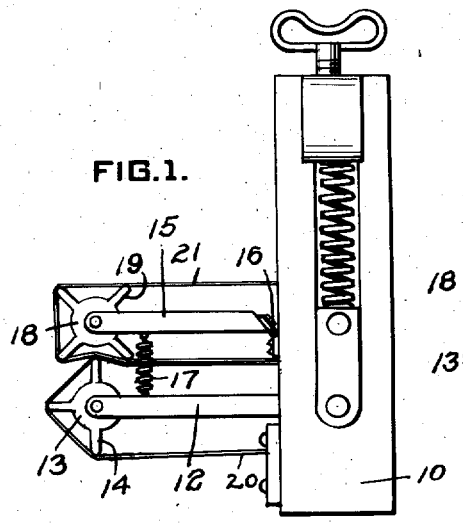
Fig. 1 shows a side elevation of a wringer device embodying my invention.
Figure 3:
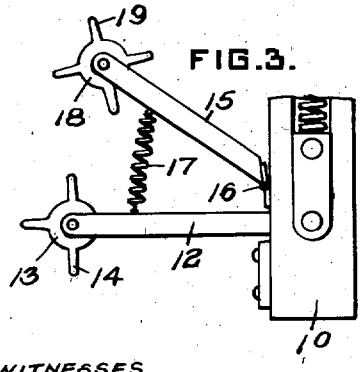
Fig. 3 shows a side elevation, illustrating the button saving device with the belts removed and the rollers separated.
Figure 2:
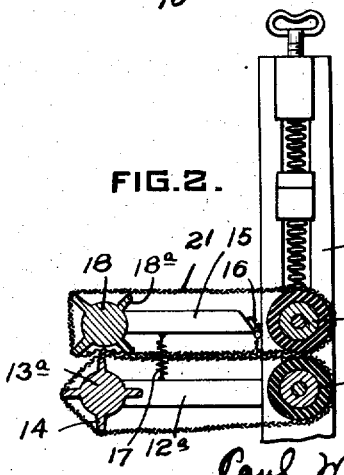
Fig. 2 is a vertical, sectional view through the same.

In the form of my invention illustrated in Figs. 1, 2 and 3, I have shown arms 12, extending horizontally away from the wringer proper, as illustrated in the drawings, and arranged parallel with each other in substantially the same horizontal plane. The arms 12 are connected at their ends farthest from the wringer by means of a rotatably mounted roller 13, preferably provided with a plurality of blades 14 having blunt edges, which blades are spaced substantially equal distances from each other circumferentially of the roller.

Spaced above each arm 12 is an arm 15, hinged at one end as at 16 to one of the upright end members of the wringer.

Springs 17 are employed for tending to draw the arms 15 and 12 at each end of the wringer together.

Between what, I may term, the outer ends of the arms 15 is a rotatably mounted roller 18, similar to the roller 13, and provided with blades 19, similar to the blades 14. Extending around the roller 13 and the lower wringer roll 11, as illustrated in Fig. 2, is an endless belt 20 of canvas or any suitable material, which is mounted in place with sufficient stretch or tension to cause it to travel when the lower wringer roll is rotated.

Extended around the roller 18 and the upper wringer roll is a similar endless belt 21.

Figure 5:
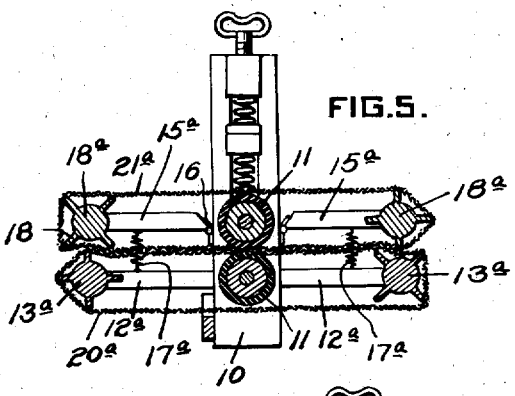
Fig. 5 is a vertical, sectional view through the form of the device illustrated in Fig. 4.

In Figs. 4 and 5, I have shown a modified form of my invention in which the structure already described with the exception of the belts, is duplicated on the opposite side of the wringer, the various parts being indicated by the reference numerals already given to their similar parts with addition of the small reference character *a*. Thus the arms are indicated with the characters $12^a$ and $15^a$ and so on.

In the case of the form of invention shown in Figs. 4 and 5, I have shown extending over two rollers $13^a$, an endless belt $20^a$, which receives the lower wringer roll between its upper and lower stretches. Extended over the rollers $18^a$ is a similar belt $21^a$, which receives between its upper and lower stretches, the upper wringer roll.

In the practical use of my improved device, the clothes are fed between the rollers 18 and 13 or between the rollers $18^a$ and $13^a$, as the case may be, and the buttons will be always pressed to position in a plane parallel with the planes of the surfaces of the endless belts, and will be fed to the wringer rolls in such position, so that the buttons will never be torn off.

It will be seen that what may be called the outer ends of the belts have considerable up and down play between the blades on the rollers, so that the buttons will always be moved into proper position for feeding to the wringer rolls.

It may be mentioned that the blades at each upper roller are staggered with relation to the blades of the respective lower roller in the operation of the machine and will always tend to remain staggered.

The springs 17 and 17[a] tend to hold the adjacent stretches or runs of the endless belts or conveyors in contact one with the other, so that the article or material carrying the buttons is simultaneously yieldingly arranged and progressively compacted prior to its introduction between the wringer rolls.

It is well-known that a common complaint against the ordinary wringers of the type herein considered arises from the fact that a great many buttons are torn from clothing in the use of such wringers. I therefore believe that I have made a very substantial advance in the art, by providing a mechanism for feeding the buttons edgewise to the wringer rolls, and thereby preventing the tearing off of the buttons.

It will be noted that my device does not in any way interfere with the ordinary operation of the wringer, and the parts which I add to the wringer to accomplish my purpose are of simple and inexpensive construction and can be furnished with the wringer or may be used as an attachment.

Some changes may be made in the construction and arrangement of the various parts of my device without departing from the essential features and purposes of my invention, and it is my intention to cover by my claims any modified forms of structure or use of mechanical equivalents, which may be reasonably included within their scope.

I claim as my invention:

1. The combination of a wringer having rolls with a pair of rollers spaced from said rolls, endless flexible members designed to extend around the respective rolls and rollers, and means formed on said rollers for alternately moving the adjacent stretchers of the endless members toward and from the rollers as they pass over said means, said means including members staggered relative to each other.

2. The combination of a wringer having rolls with a pair of endless belts extended over said rolls, means for supporting the outer ends of the stretches of said belts at points spaced from the wringer rolls and for holding said belts with stretches thereof adjacent to each other, said means including rollers having blades staggered with relation to each other on respective rollers, and means tending to draw said rollers toward each other.

3. The combination of a wringer, having rolls, a pair of rollers, means for supporting said rollers for permitting their yielding movement toward and from each other, and a pair of endless belts, said belts being extended over the respective rollers and over the respective rolls on the wringer, said rollers having staggered blades.

4. In combination with the compression rolls of a wringer, a belt support roll mounted in front of the lower compression roll, an endless conveyor belt passing around the lower compression roll and said support roll, an upwardly movable belt support roll located in front of the upper compression roll, an endless conveyor belt passing around the upper compression roll and said upwardly movable support roll, said conveyor belts being driven from the compression rolls and the upwardly movable support roller being held toward the lower limit of its movement during wringing.

5. In combination with the upper and lower compression rolls of a wringer, belt support rolls mounted on opposite sides of the lower compression roll, an endless conveyor belt passing around said belt support rolls and the lower compression roll, upwardly movable belt support rolls located on opposite sides of the upper compression roll, and an endless conveyor belt passing around said upwardly movable rolls and the upper compression roll.

In testimony whereof, I have hereunto subscribed my name this 17th day of January, 1922.

PAUL W. CARROLL.